United States Patent
Herbrich et al.

(10) Patent No.: US 7,260,560 B2
(45) Date of Patent: Aug. 21, 2007

(54) MODIFIED MOTION CONTROL FOR A VIRTUAL REALITY ENVIRONMENT

(75) Inventors: Ralf Herbrich, Cambridge (GB); Michael E. Tipping, Cambridge (GB); Mark Hatton, Suffolk (GB)

(73) Assignee: Microsoft Corporation, Redmond, WA (US)

( * ) Notice: Subject to any disclaimer, the term of this patent is extended or adjusted under 35 U.S.C. 154(b) by 865 days.

(21) Appl. No.: 10/610,167

(22) Filed: Jun. 30, 2003

(65) Prior Publication Data
US 2004/0266526 A1   Dec. 30, 2004

(51) Int. Cl.
*G06F 17/00* (2006.01)
*G06N 5/00* (2006.01)

(52) U.S. Cl. ..................................... 706/45
(58) Field of Classification Search .................. 463/31, 463/42; 706/45–47
See application file for complete search history.

(56) References Cited

U.S. PATENT DOCUMENTS 6,195,626 B1 *  2/2001  Stone ........................... 703/8
6,199,030 B1 *  3/2001  Stone ........................... 703/8
6,487,304 B1    11/2002 Szeliski
6,763,325 B1 *  7/2004  Stone ........................... 703/8

OTHER PUBLICATIONS

Bennewitz, M., Burgard, W., Thrun, S.; "Using EM to Learn Motion Behaviors of Persons with Mobile Robots"; Proceedings of the 2002 IEEE/RSJ International Conference on Intelligent Robots and Systems EPFL, Lausanne, Switzerland, Oct. 2002, pp. 502-507.

* cited by examiner

*Primary Examiner*—Anthony Knight
*Assistant Examiner*—Michael B. Holmes

(57) ABSTRACT

In a virtual reality environment, the behavior of the computer-controlled virtual vehicle may be made more human-like by increasing the AI driver's reaction time to environmental stimuli, such as physical stimuli (e.g., detecting a loss of tire traction, audio warning signals, smoke, virtual fatigue, weather changes, etc.) or "visual" stimuli (e.g., virtual visual detection by the computer driver of a turn or obstacle in its path, ambient lighting differences, etc.). Reaction time may be increased by introducing a delay in receipt of stimuli by the artificial intelligence motion control system, by introducing a delay in receipt of control signals by the physics engine, or by modifying the control signal to degrade their accuracy in approximating a prescribed racing line.

25 Claims, 10 Drawing Sheets

MODIFIED MOTION CONTROL FOR A VIRTUAL REALITY ENVIRONMENT

RELATED APPLICATIONS

This application is related to U.S. patent application Ser. No. 10/609,703 [MS303948.1/MS1-1508US] entitled "PROBABILISTIC MODEL OF DISTRACTION FOR A VIRTUAL REALITY ENVIRONMENT"; U.S. patent application No. 10/609,507 [MS303875.1/MS1-1506US], entitled "PERSONALIZED BEHAVIOR OF COMPUTER CONTROLLED AVATARS IN A VIRTUAL REALITY ENVIRONMENT"; and U.S. patent application No. 10/609,997 [MS303876.1/MS1-1507US] entitled "MIXTURE MODELS FOR MOTION LINES IN A VIRTUAL REALITY ENVIRONMENT", all filed concurrently herewith and specifically incorporated herein by reference for all that they disclosure and teach.

TECHNICAL FIELD

The invention relates generally to virtual motion control, and more particularly to modified motion control for a virtual reality environment.

DESCRIPTION

Most racing-based computer games provide a mode for competing against computer-controlled opponents that use simple forms of artificial intelligence (AI) to negotiate the race track or course in a simulated "human-like" fashion. However, the "human-like" goal of such AI tends to appear quite non-human upon close observation. For example, the computer opponent may travel along a perfect racing line along the course, whereas a human competitor typically introduces continuous imperfections into his or her driving, such as over/under turning, over/under accelerating, over/under braking, and early/late reactions. However, it is just such imperfections that characterize a "human-like" competitor.

A source of the non-human-like behavior of computer opponents is that the typical AI motion control system effectively provides a computer opponent with a reaction time of $1/60^{th}$ of a second in the USA or $1/50^{th}$ of a second in Europe (i.e., for each frame repaint interval in the virtual reality environment). Therefore, computer control of the AI opponent in reaction to any "visual" (e.g., distance to a corner) and "physical" (e.g., loss of traction) stimuli occurs 50 or 60 times a second. No human player can react so quickly or so frequently as to compete with such an opponent.

Therefore, racing game developers have built in other parameters to make the computer opponents more competitive with the human players. Some existing racing games have attempted to balance the competitiveness by causing the computer to make deliberate and flagrant errors or suffer certain artificial constraints in order to give the human competitor a chance to catch up. However, such errors are relatively drastic (e.g., causing the computer driver to arbitrarily steer off of the course or into an obstacle), unrealistic (e.g., "rubberbanding" the computer controlled vehicle to prevent the computer opponent's lead from becoming too large), or predictable (e.g., temporarily crashing the computer controlled vehicle when its lead is too large). Nevertheless, these non-human errors do not positively contribute to the realism desired in such games.

Implementations described and claimed herein enhance the human-like realism of computer opponents in racing-type games and other motion-related games. In one implementation, the reaction time of the AI driver is modified to more closely approximate that of a human. Furthermore, in another implementation, the control of the computer vehicle is altered in some way (e.g., smoothed), such that the AI control signals do not correct an out-of-line racing vehicle as quickly and accurately as in previous systems. Such control modification improves the apparent realism of the AI driver's path in the virtual reality environment.

In various implementations, articles of manufacture are provided as computer program products. One implementation of a computer program product provides a computer program storage medium readable by a computer system and encoding a computer program for a virtual reality environment. Another implementation of a computer program product may be provided in a computer data signal embodied in a carrier wave by a computing system and encoding the computer program for a virtual reality environment.

The computer program product encodes a computer program for executing on a computer system a computer process for a virtual reality environment. A stimulus delay is inserted between receipt of a stimulus from a virtual reality environment and input of the stimulus to an artificial intelligence motion control system to produce a delayed stimulus. The stimulus delay is at least one simulation interval. A control signal is generated to control motion of an artificial intelligence controlled player based on the delayed stimulus.

In another implementation, a method is provided. A stimulus delay is inserted between receipt of a stimulus from a virtual reality environment and input of the stimulus to an artificial intelligence motion control system to produce a delayed stimulus. The stimulus delay is at least one simulation interval. A control signal is generated to control motion of an artificial intelligence controlled player based on the delayed stimulus.

In yet another implementation, system is provided. An artificial intelligence motion control system generates a control signal to control motion of an artificial intelligence controlled player based on a delayed stimulus. A stimuli buffer inserts a stimulus delay between receipt of a stimulus from a virtual reality environment and input of the stimulus to the artificial intelligence motion control system to produce the delayed stimulus. The stimulus delay is at least one simulation interval.

In yet another implementation, the computer program product encodes a computer program for executing on a computer system a computer process for a virtual reality environment. A control delay is inserted between receipt of a control signal from an artificial intelligence motion control system for a virtual reality environment and input of the control signal to a physics engine to produce a delayed control signal. The control delay is at least one simulation interval. The delayed control signal is input into the physics engine to control motion of an artificial intelligence controlled player in the virtual reality environment.

In another implementation, another method is provided. A control delay is inserted between receipt of a control signal from an artificial intelligence motion control system for a virtual reality environment and input of the control signal to a physics engine to produce a delayed control signal. The control delay is at least one simulation interval. The delayed control signal is input into the physics engine to control motion of an artificial intelligence controlled player in the virtual reality environment.

In yet another implementation, another system is provided. A physics engine inputs a delayed control signal to simulate motion of an artificial intelligence controlled player based on the delayed control signal. A control buffer inserts a control delay between receipt of a control signal from an artificial intelligence motion control system for a virtual reality environment and input of the control signal to the physics engine to produce a delayed control signal. The delay is at least one simulation interval.

In yet another implementation, yet another computer program product is provided. A control signal is generated to control motion of an artificial intelligence controlled player to approximate a prescribed line of motion. The control signal is modified to produce a modified control signal that controls the motion of the artificial intelligence controlled player to approximate the prescribed line of motion less accurately than the control signal. The modified control signal is input to a physics engine to simulate the motion of an artificial intelligence controlled player in a virtual reality environment based on the modified control signal.

In yet another implementation, yet another method is provided. A control signal is generated to control motion of an artificial intelligence controlled player to approximate a prescribed line of motion. The control signal is modified to produce a modified control signal that controls the motion of the artificial intelligence controlled player to approximate the prescribed line of motion less accurately than the control signal. The modified control signal is input to a physics engine to simulate the motion of an artificial intelligence controlled player in a virtual reality environment based on the modified control signal.

In yet another implementation, yet another system is provided. An artificial intelligence motion control system generates a control signal to control motion of an artificial intelligence controlled player to approximate a prescribed line of motion. A control modifier modifies the control signal to produce a modified control signal. The modified control signal controls the motion of the artificial intelligence controlled player to approximate the prescribed line of motion less accurately than the control signal. A physics engine inputs the modified control signal to simulate the motion of an artificial intelligence controlled player in a virtual reality environment based on the modified control signal.

Other implementations are also described and recited herein.

Brief description of the drawings included herein are listed below.

Racing-based computer games typically include a mode in which one or more human players can compete against one or more computer-controlled opponents. For example, a human player may drive a virtual race car against a computer-controlled virtual race car purported to be driven by Mario Andretti or some other race car driver.

In one implementation, the behavior of the computer-controlled virtual racing vehicle may be made more human-like by increasing the AI driver's reaction time to stimuli, such as physical stimuli (e.g., detecting a loss of tire traction, audio warning signals, smoke, virtual fatigue, weather changes, etc.) or "visual" stimuli (e.g., virtual visual detection by the computer driver of a turn or obstacle in its path, ambient lighting differences, etc.). It should also be understood that implementations may be applied to various types of racing games, including boat racing, skiing, skating, plane racing, etc., and other types of non-racing motion-based simulations, including combat simulations, reality simulations, etc.

Figure 1:
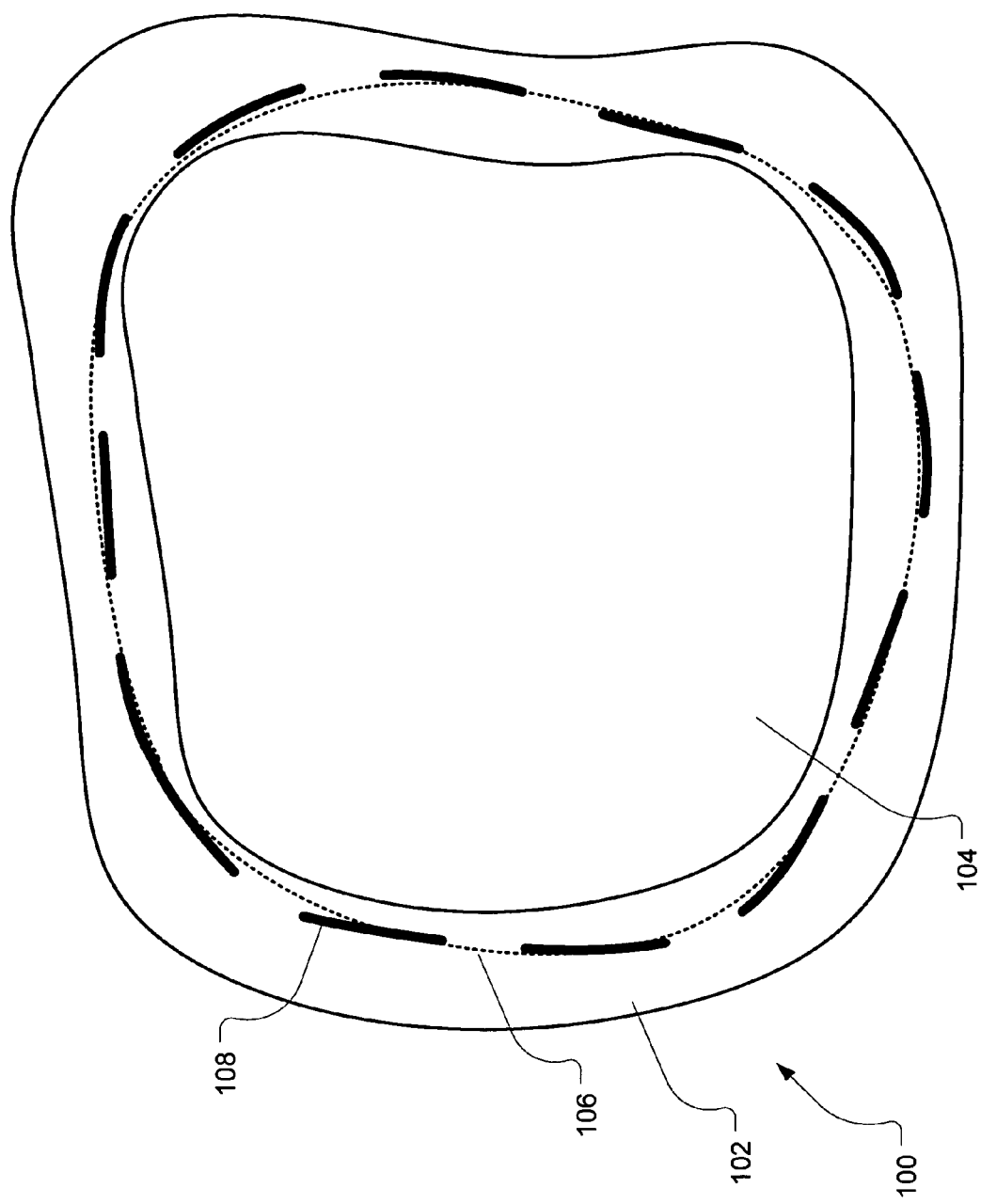
FIG. 1 illustrates a race course, an exemplary prescribed racing line, and an exemplary simulated path of a virtual racing vehicle

FIG. 1 illustrates a race course, an exemplary prescribed racing line, and an exemplary simulated path of a virtual racing vehicle. A virtual race course 100 includes a racing surface 102 and an infield 104. It should be understood that an alternative course may not be closed or may be applied to a non-racing environment, such as a first person shooter game, a military simulation, or a reality simulation. As such, a computer controlled driver may be replaced by a computer controlled (or artificial intelligence controlled) player represented as any moving object.

A prescribed racing line 106 is associated with the virtual race course 100. Such a prescribed racing line 106 is typically designed into the game by the game designers as the target line for the AI controlled vehicles. Various types of prescribed racing lines may include ideal and non-ideal racing lines for a course and may be characterized by various ideal and non-ideal parameters, including steering, braking, speed, and acceleration parameter sequences. At a specified interval (such as a simulation interval), an AI motion control system receives stimulus inputs and computes control signals based on these inputs to change the direction, speed, etc. of the computer vehicle. The changes are generally intended to bring the racing vehicle back into alignment with the prescribed racing line 106.

A path 108 represents the line actually taken by an AI controlled vehicle in one implementation. The path 108 is a degraded version of the prescribed racing line 106. That is, additional effects have been introduced into the computer driver's control to simulate a more human-like performance. As such, the path 108 is less perfect (or less accurate as compared to an ideal prescribed racing line) than that of a typical computer controlled driver. At least three effects may contribute individually or collectively to this human-like modification of the path simulation. First, stimuli may be delayed before being sent to the AI motion control system, thereby increasing the computer driver's overall reaction time to the stimuli. It can be said that this effect simulates the slower perception speed of a human driver, which is not instantaneous or even near $1/50^{th}$ or $1/60^{th}$ of a second, typically. Similarly, the control signals computed in reaction to the stimuli may be delayed before being sent to the physics engine, thereby also slowing the AI driver's overall reaction time to the stimuli. It can be said that this effect simulates the slow reaction speed of a human driver once a stimulus has been detected, which is not instantaneous or even $1/50^{th}$ or $1/60^{th}$ of a second, typically.

A third effect relates to modification of the control signals after they are computed by the AI motion control system.

Existing AI motion control systems can compute control signals that very rapidly converge to or accurately approximate the prescribed line of motion. By modifying such control signals, an improved racing system can better emulate the analog response of a human driver by altering the amount or rate of change of control signals sent to the physics engine.

Figure 2:
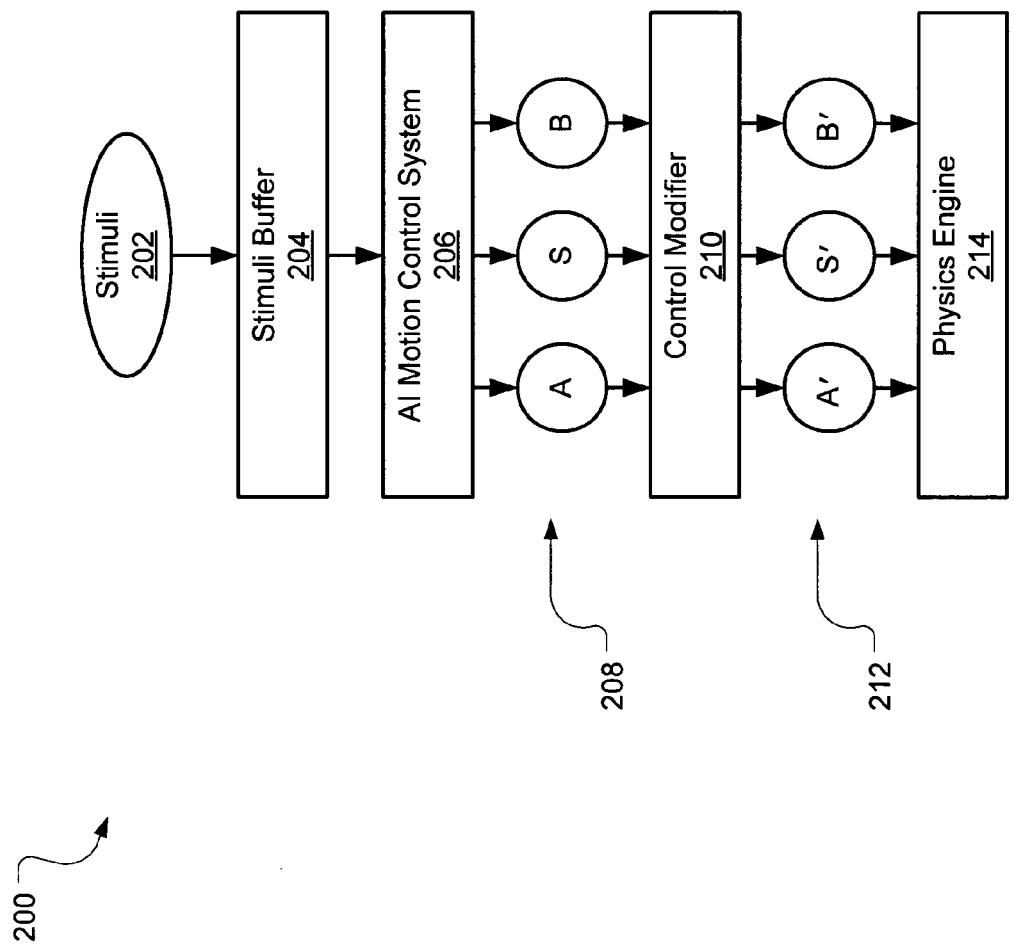
FIG. 2 illustrates exemplary components of a virtual racing game system.

FIG. 2 illustrates exemplary components of a virtual racing game system 200. In this implementation, stimuli 202 received from the virtual reality environment are buffered to increase the perception time of the computer driver. Stimuli 202 may include various types of stimuli, including without limitation those stimuli listed below:

"Visual" stimuli—Includes structures, objects, actions, and characteristics which would be seen by a virtual driver controlling the race in the virtual reality environment (e.g., other vehicles, walls, obstacles, course markings, etc.).

"Physical" stimuli—Includes non-visual sensations detected by a virtual driver controlling the vehicle in the virtual reality environment (e.g., loss of tire traction, heat, fatigue, audio signals, etc.).

Each type of stimuli may be represented by a stimulus signal, which in one implementation, includes a parameter value indicating the properties of the particular type of stimulus in a given simulation interval. For example, one visual stimulus signal may indicate the location of another vehicle on the course relative to the current AI vehicle. A physical stimulus signal may indicate that the computer control vehicle has lost traction (e.g., a detection of tire slippage).

Each stimulus signal is received by a stimulus buffer 204, which delays the delivery of the stimuli 202 to an AI motion control system 206. The AI motion control system 206 computes control signals 208, where "A" represents an acceleration control signal, "S" represents a steering control signal, and "B" represents a braking control signal. It should be understood, however, that other types of control signals are contemplated, including without limitation a speed control signal, a hand or emergency braking signal, a turbo or boost signal, a jump control signal, a weapon trigger signal.

The control signals 208 are input to a control modifier 210, which may modify the control signals 208, to produce modified control signals 212 (i.e., A', S', and B'). It should be understood that the control modifier 210 may be omitted in another implementation. The modified control signals 212 are then input to a physics engine 214, which applies the modified control signals to the AI controlled vehicle in the virtual reality environment to simulate the motion of the vehicle.

Figure 3:
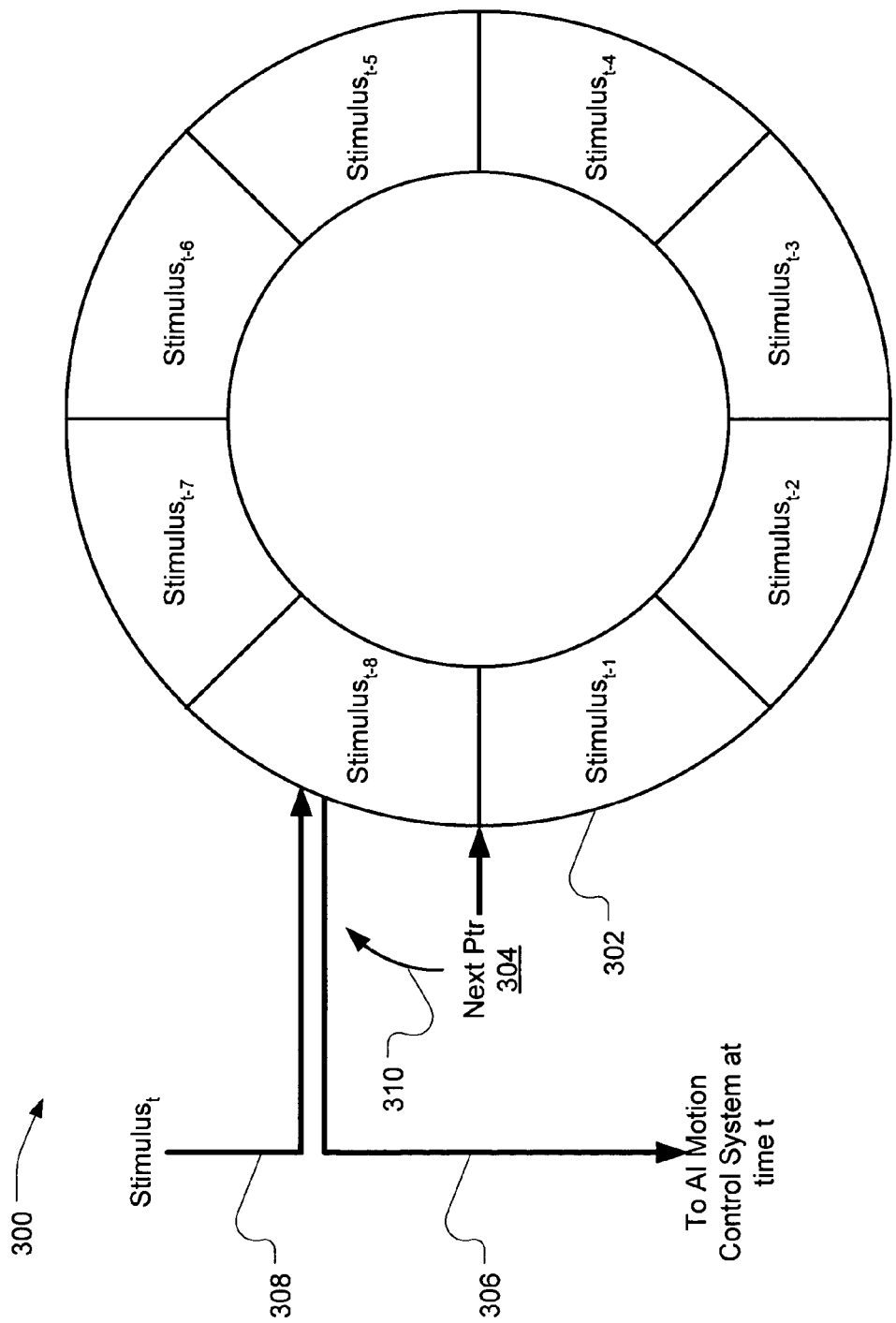
FIG. 3 illustrates an exemplary stimuli buffer.

FIG. 3 illustrates an exemplary stimuli buffer 300, in the form of a FIFO (First In, First Out) circular buffer 302. In each simulation interval, a previously stored (i.e., delayed) stimulus value, such as $Stimulus_{t-8}$, is extracted from the location in the buffer 302 that is indicated by the Next pointer 304. The extracted stimulus value is sent to the AI motion control system via output path 306 (e.g., via a memory location, a passed parameter, or a return result) at time t. A current stimulus value, as indicated by $Stimulus_t$, is received at time t via input path 308 (e.g., via a memory location, a passed parameter, or a return result) and stored in the buffer 302 at the location indicated by the Next pointer 304. Thereafter, the Next pointer 304 is incremented to the next location in the circular buffer 302, in the direction indicated by the arrow 310.

It should be understood that other types of buffering architectures may also be used, including linear buffers. Furthermore, any other type of delay mechanism may be employed to slow the reaction of the computer driver by delaying the receipt and processing of the stimuli.

Figure 4:
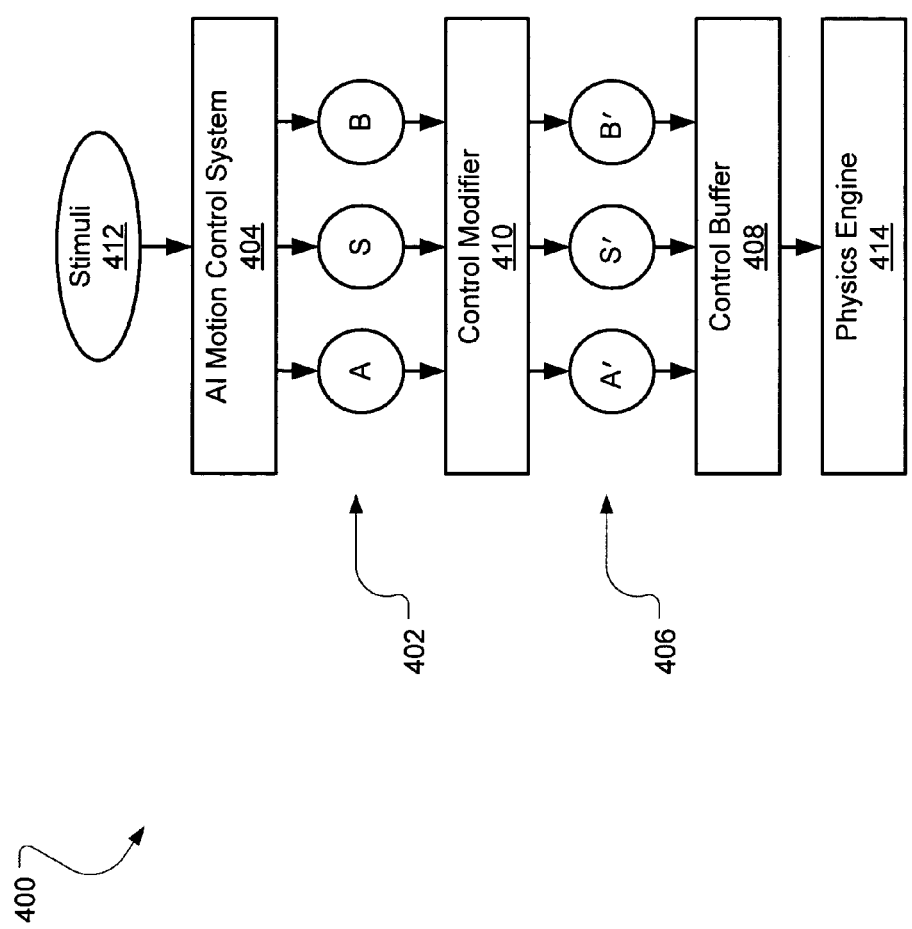
FIG. 4 illustrates exemplary components of an alternative virtual racing game system.

FIG. 4 illustrates exemplary components of an alternative virtual racing game system 400. Control signals 402 generated by an AI motion control system 404 (or modified control signals 406 generated by a control modifier 408) are buffered in a control buffer 410 to slow the reaction of the computer driver.

In this implementation, stimuli 412 received from the virtual reality environment are received by the AI motion control system 404. The AI motion control system 404 computes control signals 402, where "A" represents an acceleration control signal, "S" represents a steering control signal, and "B" represents a braking control signal. It should be understood, however, that other types of control signals are contemplated, including without limitation a speed control signal.

The control signals 402 are input to a control modifier 408, which may modify the control signals 402, to produce modified control signals 406 (i.e., A', S', and B'). It should be understood that the control modifier 408 may be omitted in another implementation. The modified control signals 406 are then input to a physics engine 414, which applies the modified control signals 406 to the AI controlled vehicle in the virtual reality environment to simulate motion of the vehicle.

Figure 5:
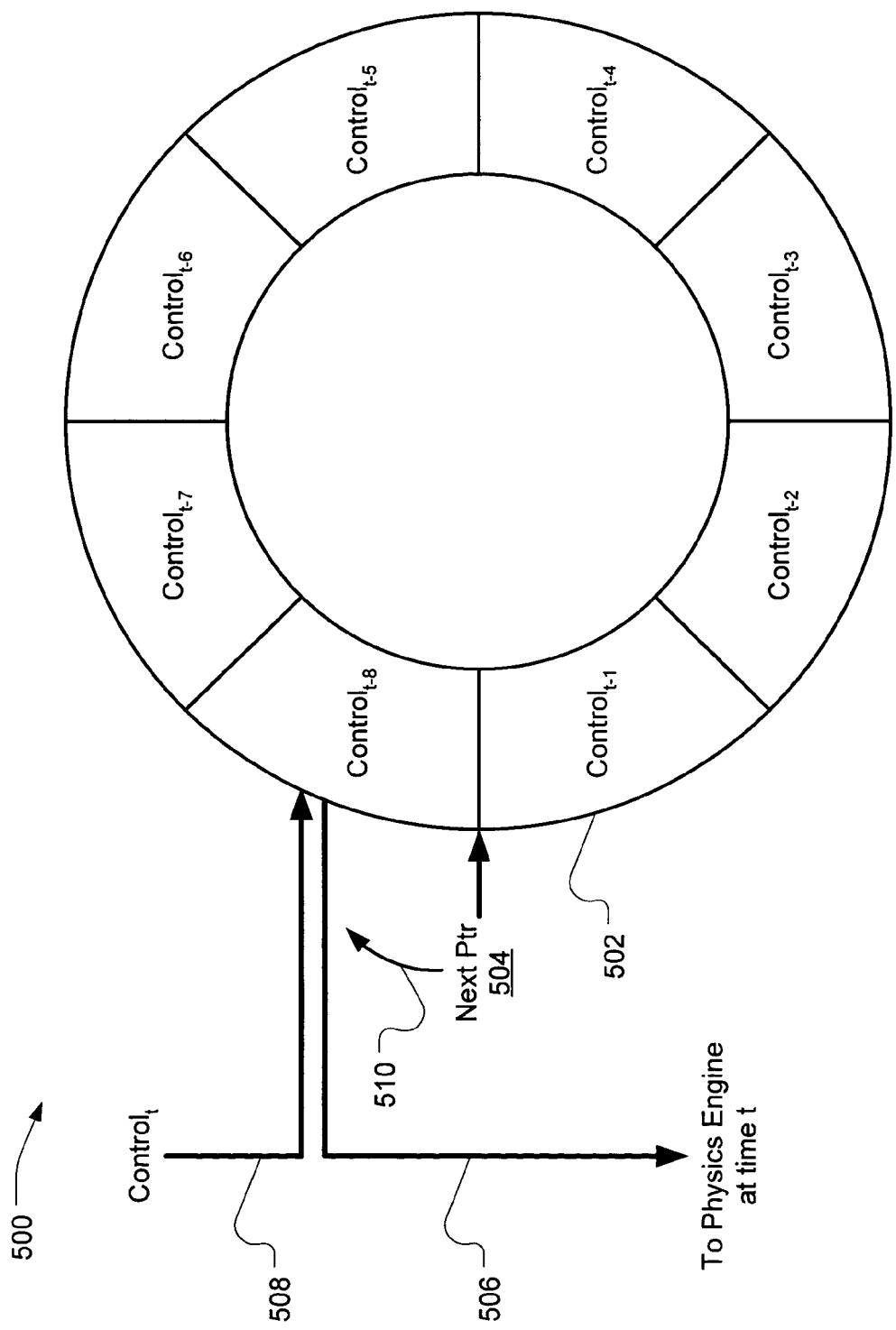
FIG. 5 illustrates an exemplary control buffer.

FIG. 5 illustrates an exemplary control buffer 500, in the form of a FIFO (First In, First Out) circular buffer 502. In each simulation interval, a previously stored (i.e., delayed) control value, such as $Control_{t-8}$, is extracted from the location in the buffer 502 that indicated by the Next pointer 504. The extracted control value is sent to the physics engine via output path 506 (e.g., via a memory location, a passed parameter, or a return result) at time t. A current control value, as indicated by $Control_t$, is received at time t via input path 508 (e.g., via a memory location, a passed parameter, or a return result) from a control filter or an AI motion control system and stored in the buffer 502 at the location indicated by the Next pointer 504. Thereafter, the Next pointer 504 is incremented to the next location in the circular buffer 502, in the direction indicated by the arrow 510.

It should be understood that other types of buffering architectures may also be used, including linear buffers. Furthermore, any other type of delay mechanism may be employed to slow the reaction of the computer driver by delaying the receipt and processing of the control signals.

Figure 6:
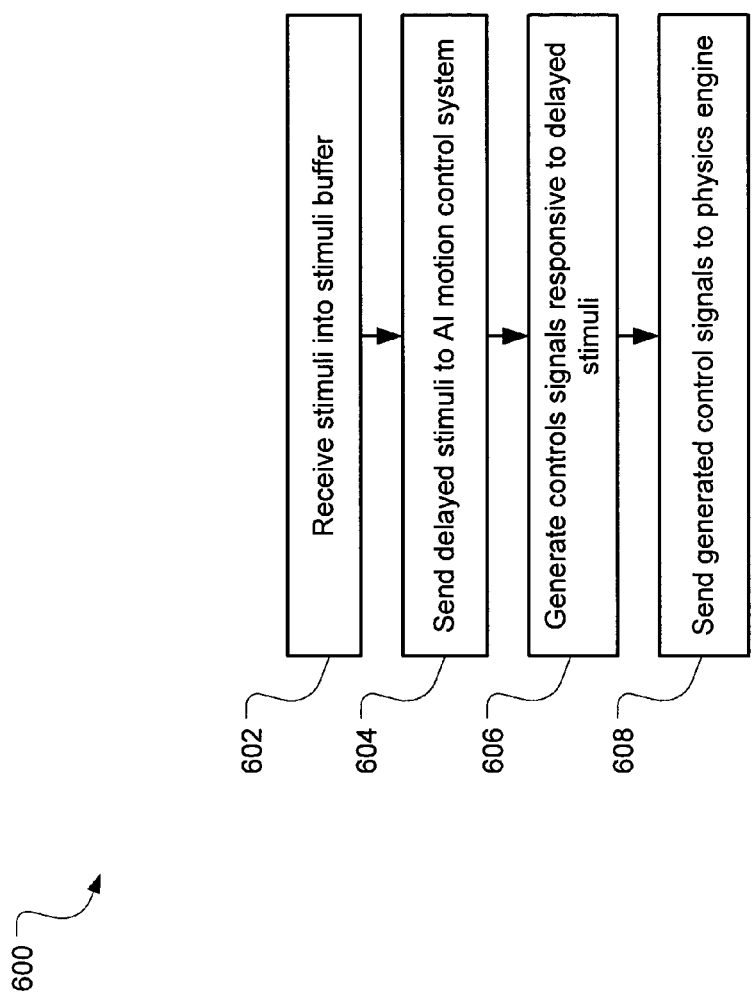
FIG. 6 illustrates exemplary operations for modifying path simulation based on delayed stimuli.

FIG. 6 illustrates exemplary operations 600 for modifying path simulation based on delayed stimuli. At each simulation interval (e.g., a frame interval), a receipt operation 600 receives stimuli into the stimuli buffer, which holds the stimuli and then sends the stimuli on to the AI motion control system after a delay of at least one simulation interval (e.g., a frame interval) in sending operation 604.

A generation operation 606 generates control signals responsive to the delayed stimuli. A sending operation 608 sends the generated control signals to the physics engine to apply to the virtual reality environment. Alternatively, a control modifying operation and/or a control buffering operation may be inserted between operations 606 and 608.

Figure 7:
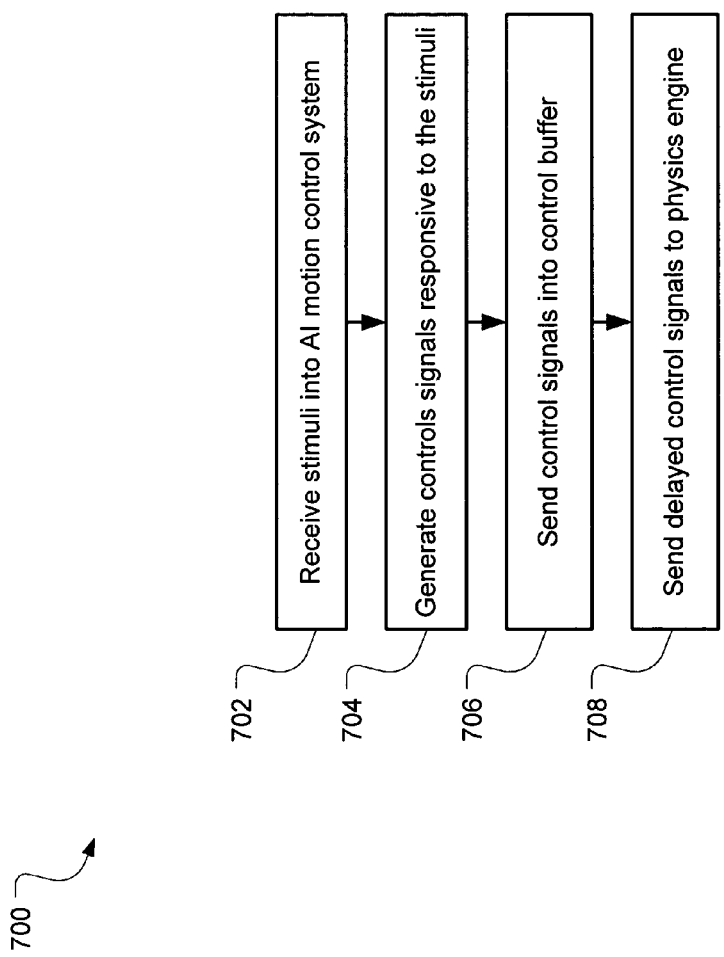
FIG. 7 illustrates exemplary operations for modifying path simulation based on delayed control signals.

FIG. 7 illustrates exemplary operations 700 for modifying path simulation based on delayed control signals. A receipt operation 702 receives stimuli into the AI motion control system, which generates control signals responsive to the stimuli in a generation operation 704. A sending operation 706 sends the control signals into a control buffer, which delays the application of the control signals for at least one simulation interval (e.g., a frame interval). A sending operation sends the delayed control signals to the physics engine, which applies the control signals in the virtual reality environment.

Alternatively, a control modifying operation is inserted in the process, such that the control signals are sent instead to a control filter, which modifies the control signals to introduce more human-like behavior into the AI driver. The modified control signals are then sent to the control buffer for delay. In another alternative implementation, a stimuli buffering operation may also be employed to further slow the reaction of the computer driver.

Furthermore, buffering can be configured individually for different types of stimuli and controls. For example, a loss of traction stimulus (or reaction thereto) may be delayed longer (e.g., by using a longer buffer) than an observation of another vehicle. Moreover, the length of the operative buffering can be modified dynamically throughout the race (e.g., between different simulation intervals), over multiple races, or between different drivers. For example, observation of an obstacle may be delayed longer around a blind corner than on a clear straightaway. Likewise, an exceptionally good AI driver (e.g., the driver representing last year's Formula One Champion) may be given shorter buffers for some stimuli and controls than other less "talented" AI drivers. Longer buffers may also reflect the effects of different track surfaces or corner types (e.g., sloped or non-sloped) for individual drivers. For example, one AI driver may be very skilled at 90° right hand curves (i.e., reflected by a short delay) but not very skilled at hairpin left hand curves (i.e., reflected by a long delay). Another AI driver may be characterized by the exact opposite delays or some other combination of delays.

Figure 8:
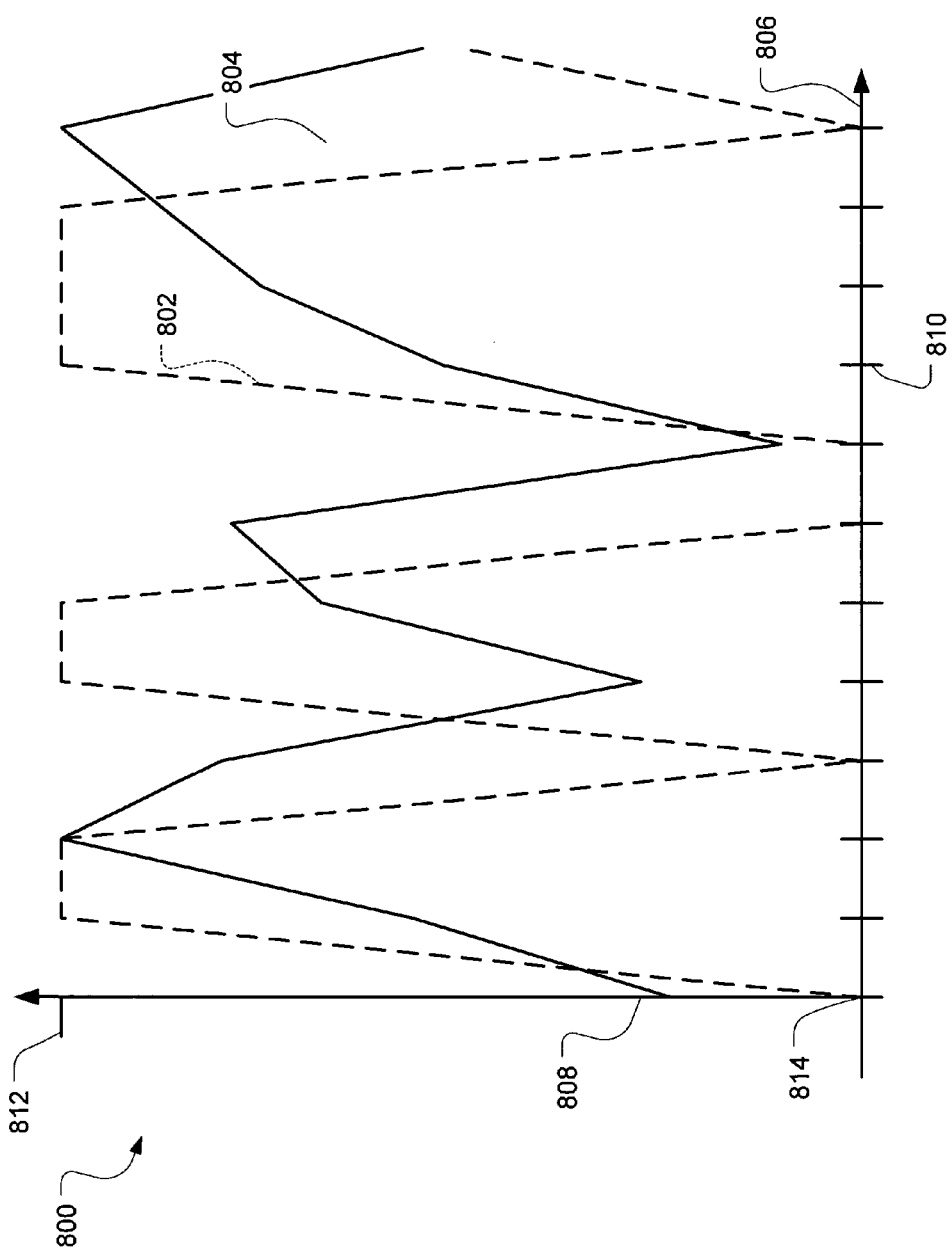
FIG. 8 illustrates an exemplary filtered control signal for acceleration.

FIG. 8 illustrates an exemplary filtered control signal for acceleration. A plot 800 shows an exemplary non-modified acceleration control signal 802 and a modified control signal 804. An axis 806 represents time, wherein simulation intervals, such as shown by mark 810 progress in sequence from left to right. Another axis 808 represents acceleration, wherein maximum acceleration is shown at mark 812 and minimum acceleration (e.g., zero acceleration) is shown at mark 814.

The control filter that converts control signals into modified controls signals may take many forms. In one implementation, the control filter considers a control signal value from a previous time interval in its computation of a modified control signal for the current interval, as shown by example:

$$A'_t = \alpha A_t + (1-\alpha) A_{t-1} \quad (1)$$

where $A'_t$ represents the modified acceleration control signal at time t, $A_t$ represents the unmodified acceleration control signal at time t, $A_{t-1}$ represents the unmodified acceleration control signal at time t-1, and $\alpha$ represents a smoothing factor that reduced the aggressive acceleration correction control signals output by the AI motion control system. Equation (1) represents finite impulse response (FIR) linear filtering. However, many other filtering techniques may be applied to modify the control signals in order to better reproduce human driving behavior.

Figure 9:
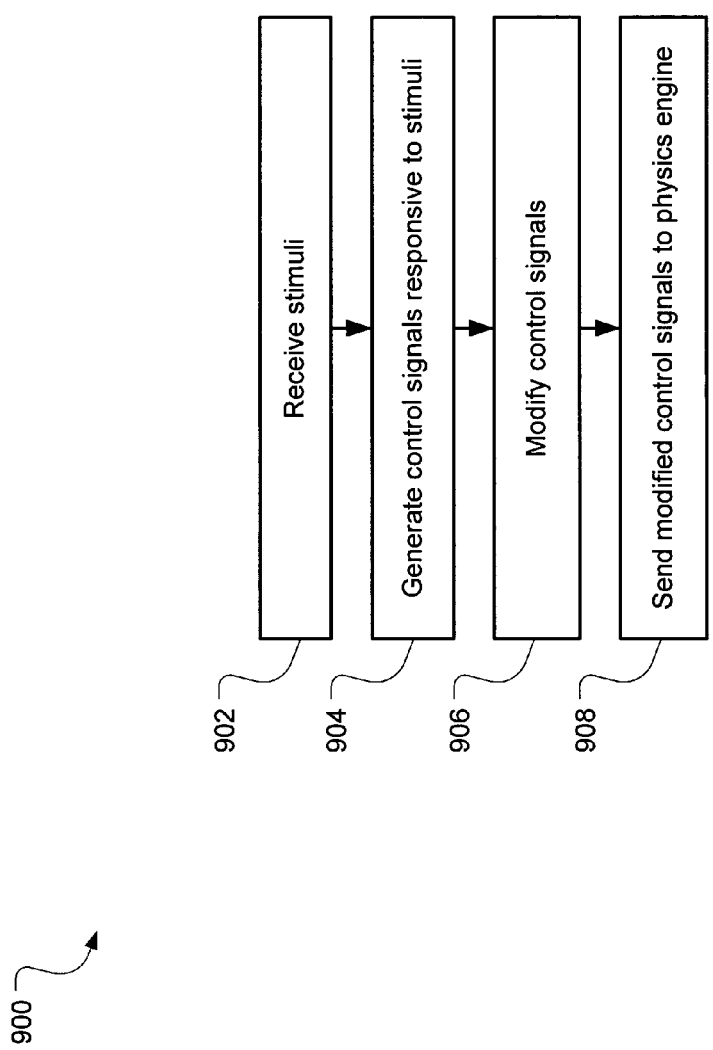
FIG. 9 illustrates exemplary operations for modifying path simulation based on modified control signals.

FIG. 9 illustrates exemplary operations 900 for modifying path simulation based on modified control signals. A receipt operation 902 receives stimuli (e.g., into a stimuli buffer or AI motion control system). A generation operation 904 generates control signals responsive to the stimuli in order to approximate a prescribed line of motion. A modification operation 906 modifies the control signals (or the delayed control signals from a control buffer) to produce modified control signals, which are sent to the physics engine (or a control buffer).

It should be understood that the stimuli buffer, the control buffer, and the control filter may be employed individually or in any combination to modify the motion simulation in the virtual reality environment. In addition, these same techniques may be employed to non-AI players. For example, the control buffer may be used to introduce a more sluggish control response for a more advanced player in order to handicap him or her. Based on player identities, it is also possible to base the amount of delay and/or smoothing experienced by an advanced player by maintaining statistics about the various human players and applying modifications over multiple games or during game play so as to make the racing more competitive. In this manner, more experienced and less experienced players can both enjoy a competitive race with each other.

Figure 10:
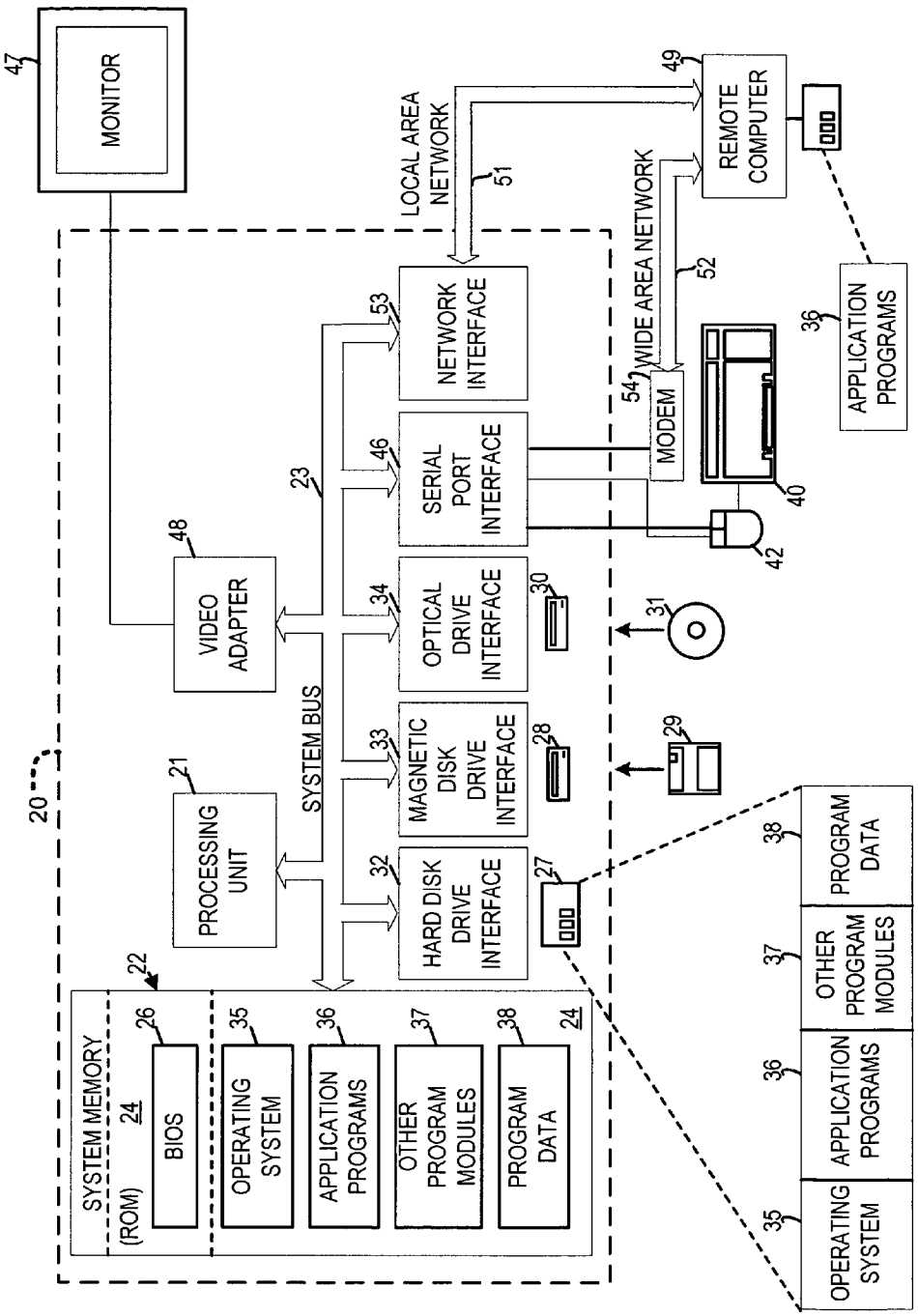
FIG. 10 illustrates an exemplary system useful for implementing an embodiment of the present invention.

The exemplary hardware and operating environment of FIG. 10 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 10. The logical connections depicted in FIG. 10 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, AI motion control systems, physics engines, control modifiers, or other modules may be incorporated as part of the operating system 35, application programs 36, or other program modules 37. The stimuli signals, control signals, and modified control signals may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method comprising:
    inserting a stimulus delay between receipt of a stimulus from a virtual reality environment and input of the stimulus to an artificial intelligence motion control system to produce a delayed stimulus, the stimulus delay being at least one simulation interval;
    generating a control signal to control motion of an artificial intelligence controlled player based on the delayed; and
    wherein a length of the stimulus delay is changeable between different game sessions in the virtual reality environment.

2. The method of claim 1 wherein the length of the stimulus delay is changeable between different simulation intervals.

3. The method of claim 1 wherein the length of the stimulus delay for a given stimulus is different for different artificial intelligence controlled players in the virtual reality environment.

4. The method of claim 1 wherein the inserting operation comprises:
    receiving the stimulus into a stimuli buffer to delay input of the stimulus to the artificial intelligence motion control system.

5. The method of claim 1 wherein the stimulus is of a first type of stimulus, the stimulus delay is a first stimulus delay, and further comprising:
    inserting a second stimulus delay between receipt of a second type of stimulus from the virtual reality environment and input of the second type of stimulus to the artificial intelligence motion control system, the second stimulus delay being greater than the first stimulus delay.

6. The method of claim 1 wherein the generating operation comprises:
    generating a control signal for a current simulation interval using stimulus from a previous simulation interval.

7. One or more computer-readable media containing executable instructions that, when executed, perform a process comprising:
    inserting a stimulus delay between receipt of a stimulus from a virtual reality environment and input of the stimulus to an artificial intelligence motion control system to produce a delayed stimulus, the stimulus delay being at least one simulation interval;
    generating a control signal to control motion of an artificial intelligence controlled player based on the delayed; and
    wherein a length of the stimulus delay is changeable from a first game session to a second game session in the virtual reality environment.

8. The one or more computer-readable media of claim 7 wherein the length of the stimulus delay is changeable between different simulation intervals.

9. The one or more computer-readable media of claim 7 wherein the length of the stimulus delay for a given stimulus is different for different artificial intelligence controlled players in the virtual reality environment.

10. The one or more computer-readable media of claim 7 wherein the inserting operation comprises:
    receiving the stimulus into a stimuli buffer to delay input of the stimulus to the artificial intelligence motion control system.

11. The one or more computer-readable media of claim 7 wherein the stimulus is of a first type of stimulus, the stimulus delay is a first stimulus delay, and the computer process further comprises:
  inserting a second stimulus delay between receipt of a second type of stimulus from the virtual reality environment and input of the second type of stimulus to the artificial intelligence motion control system, the second stimulus delay being greater than the first stimulus delay.

12. The one or more computer-readable media of claim 7 wherein the generating operation comprises:
  generating a control signal for a current simulation interval using stimulus from a previous simulation interval.

13. A method comprising:
  inserting a control delay between receipt of a control signal from an artificial intelligence motion control system for a virtual reality environment and input of the control signal to a physics engine to produce a delayed control signal, the control delay having a length of at least one simulation interval;
  inputting the delayed control signal into the physics engine to control motion of an artificial intelligence controlled player in the virtual reality environment; and
  simulating motion of the artificial intelligence controlled player in a current simulation interval based on the delayed control signal associated with a previous simulation interval.

14. The method of claim 13 wherein the length of the control delay changes between different game sessions in the virtual reality environment.

15. The method of claim 13 wherein the length of the control delay changes between different simulation intervals.

16. The method of claim 13 wherein the length of the control delay for a given control signal is different for different artificial intelligence controlled players in the virtual reality environment.

17. The method of claim 13 wherein the inserting operation comprises:
  receiving the control signal into a control buffer to delay input of the control signal to the physics engine.

18. The method of claim 13 wherein the control signal is of a first control type, the control delay is a first control delay, and further comprising:
  inserting a second control delay between receipt of a second type of control signal from the artificial intelligence motion control system and input of the second type of control signal to the physics engine, the second control delay being greater than the first control delay.

19. One or more computer-readable media containing executable instructions that, when executed, perform a process comprising:
  inserting a control delay between receipt of a control signal from an artificial intelligence motion control system for a virtual reality environment and input of the control signal to a physics engine to produce a delayed control signal, the control delay having a length of at least one simulation interval;
  inputting the delayed control signal into the physics engine to control motion of an artificial intelligence controlled player in the virtual reality; and
  simulating motion of the artificial intelligence controlled player in a current simulation interval based on the delayed control signal.

20. The one or more computer-readable media of claim 19 wherein the computer process further comprises:
  simulating motion of an artificial intelligence controlled player in a current simulation interval based on the delayed control signal.

21. The one or more computer-readable media of claim 19 wherein the length of the control delay changes between different game sessions in the virtual reality environment.

22. The one or more computer-readable media of claim 19 wherein the length of the control delay changes between different simulation intervals.

23. The one or more computer-readable media of claim 19 wherein the length of the control delay for a given control signal is different for different artificial intelligence controlled players in the virtual reality environment.

24. The one or more computer-readable media of claim 19 wherein the inserting operation comprises:
  receiving the control signal into a control buffer to delay input of the control signal to the physics engine.

25. The one or more computer-readable media of claim 19 wherein the control signal is of a first control type, the control delay is a first control delay, and the computer process further comprises:
  inserting a second control delay between receipt of a second type of control signal from the artificial intelligence motion control system and input of the second type of control signal to the physics engine, the second control delay being greater than the first control delay.

* * * * *